United States Patent
Mujibiya et al.

(10) Patent No.: US 10,251,207 B2
(45) Date of Patent: Apr. 2, 2019

(54) WIRELESS MOBILE COMMUNICATION APPARATUS, WIRELESS COMMUNICATION METHOD AND PROGRAM

(71) Applicant: Rakuten, Inc., Tokyo (JP)

(72) Inventors: Adiyan Mujibiya, Tokyo (JP); Jonathan Chung, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 15/557,505

(22) PCT Filed: Mar. 13, 2015

(86) PCT No.: PCT/JP2015/057594
§ 371 (c)(1),
(2) Date: Sep. 12, 2017

(87) PCT Pub. No.: WO2016/147277
PCT Pub. Date: Sep. 22, 2016

(65) Prior Publication Data
US 2018/0054844 A1 Feb. 22, 2018

(51) Int. Cl.
*H04W 4/80* (2018.01)
*H04W 76/14* (2018.01)
*H04M 1/725* (2006.01)

(52) U.S. Cl.
CPC ....... *H04W 76/14* (2018.02); *H04M 1/72569* (2013.01); *H04W 4/80* (2018.02); *H04M 1/72577* (2013.01); *H04M 2250/12* (2013.01)

(58) Field of Classification Search
CPC .................................................... H04W 76/14
(Continued)

(56) References Cited

U.S. PATENT DOCUMENTS

2006/0109143 A1 5/2006 Rekimoto
2008/0039212 A1* 2/2008 Ahlgren ............... H04M 1/7253
463/46
(Continued)

FOREIGN PATENT DOCUMENTS

JP         4111165 B2    7/2008
JP      2011-096102 A    5/2011
(Continued)

OTHER PUBLICATIONS

English translation of the International Search Report dated Sep. 22, 2016 for PCT/JP2015/057596.

*Primary Examiner* — Wen W Huang
(74) *Attorney, Agent, or Firm* — HEA Law PLLC

(57) ABSTRACT

In order to enable wireless communication to/from an intended partner user's portable wireless communication device to be reliably established, provided is a portable wireless communication device, including first attitude information acquisition means for acquiring first attitude information indicating a roll angle or a pitch angle of the portable wireless communication device; second attitude information reception means for receiving, via wireless communication, second attitude information indicating a roll angle or a pitch angle of a partner communication device from the partner communication device; and determination means for determining whether or not to establish a communication connection to the partner communication device based on a bearing of each of the portable wireless communication device and the partner communication device, the first attitude information, and the second attitude information.

11 Claims, 6 Drawing Sheets

(58) Field of Classification Search
USPC .................................... 455/41.1, 41.2, 41.3
See application file for complete search history.

(56) References Cited

U.S. PATENT DOCUMENTS

| | | |
|---|---|---|
| 2009/0221298 A1 | 9/2009 | Hanner |
| 2011/0298824 A1 | 12/2011 | Lee et al. |
| 2014/0206288 A1* | 7/2014 | Liu ..................... H04W 12/04 455/41.2 |
| 2015/0147968 A1* | 5/2015 | Friedman ............ H04W 76/023 455/41.2 |
| 2015/0236922 A1* | 8/2015 | Xiong .................... H04L 41/22 715/748 |

FOREIGN PATENT DOCUMENTS

| | | |
|---|---|---|
| JP | 2011-518452 A | 6/2011 |
| JP | 2012-059090 A | 3/2012 |
| WO | 2013/124851 A1 | 8/2013 |

* cited by examiner

FIG.6

| TERMINAL ID | DATA 1 | DATA 2 | ... | CURRENT EVALUATION VALUE | MAXIMUM EVALUATION VALUE INCREASE | COUNTER | LIST REGISTRATION TIME |
|---|---|---|---|---|---|---|---|
| X | (D,P,R) | (D,P,R) | ... | $E_X$ | $\frac{dE_X}{dt}$ | $T_X$ | XX:XX |
| Y | (D,P,R) | (D,P,R) | ... | $E_Y$ | $\frac{dE_Y}{dt}$ | $T_Y$ | YY:YY |

# WIRELESS MOBILE COMMUNICATION APPARATUS, WIRELESS COMMUNICATION METHOD AND PROGRAM

CROSS REFERENCE TO RELATED APPLICATIONS

This application is a National Stage of International Application No. PCT/JP2015/057594 filed on Mar. 13, 2015. The contents of the above document is incorporated herein by reference in its entirety.

TECHNICAL FIELD

The present invention relates to a portable wireless communication device, a wireless communication method, and a program, and more particularly, to establishing a communication connection between portable wireless communication devices.

BACKGROUND ART

Wireless communication by portable wireless communication devices is carried out in accordance with wireless communication standards, for example, the Institute of Electrical and Electronics Engineers (IEEE) 802.11 standard and the Bluetooth (trademark) standard. In general, in those wireless communication standards, a user manually selects one of wireless communication devices from a list displayed on a display, to thereby select a wireless communication device to serve as a communication partner. However, in order for the user to manually select the wireless communication device from the list as described above, the user is required to have previous knowledge of identification information, for example, a service set identifier (SSID) and a name, on the wireless communication device that is to serve as the communication partner.

In a wireless communication system disclosed in Patent Literature 1, bearing information on two electronic devices, which is acquired by electronic compasses, is used to determine whether or not to establish a connection via wireless communication between the two electronic devices. In this way, a user can perform an intuitive operation of matching the orientations of the electronic devices, to thereby establish the connection via wireless communication between the two electronic devices even without previous knowledge of the identification information on the wireless communication device that is to serve as the communication partner.

CITATION LIST

Patent Literature

[PTL 1] JP 2012-059090 A

SUMMARY OF INVENTION

Technical Problem

When a plurality of electronic devices exist in an area in which wireless communication is possible, the bearings of two electronic devices sometimes happen to be opposite to each other. Therefore, with the above-mentioned wireless communication system of the related art, there is a possibility that the connection via wireless communication between the two electronic devices is erroneously established in such a state.

The present invention has been made in order to solve the above-mentioned problem, and has an object to provide a portable wireless communication device, a wireless communication method, and a program that are capable of reliably establishing wireless communication to/from an intended partner user's portable wireless communication device.

Solution to Problem

In order to solve the above-mentioned problem, a portable wireless communication device according to one aspect of the present invention includes: first attitude information acquisition means for acquiring first attitude information indicating a roll angle or a pitch angle of the portable wireless communication device; second attitude information reception means for receiving, via wireless communication, second attitude information indicating a roll angle or a pitch angle of a partner communication device from the partner communication device; and determination means for determining whether or not to establish a communication connection to the partner communication device based on a bearing of each of the portable wireless communication device and the partner communication device, the first attitude information, and the second attitude information.

Further, a wireless communication method according to another aspect of the present invention includes: a first attitude information acquisition step of acquiring first attitude information indicating a roll angle or a pitch angle of a portable wireless communication device; a second attitude information reception step of receiving, via wireless communication, second attitude information indicating a roll angle or a pitch angle of a partner communication device from the partner communication device; and a determination step of determining whether or not to establish a communication connection to the partner communication device based on a bearing of each of the portable wireless communication device and the partner communication device, the first attitude information, and the second attitude information.

A program according to still another aspect of the present invention is a program for causing a computer to execute: a first attitude information acquisition step of acquiring first attitude information indicating a roll angle or a pitch angle of a portable wireless communication device; a second attitude information reception step of receiving, via wireless communication, second attitude information indicating a roll angle or a pitch angle of a partner communication device from the partner communication device; and a determination step of determining whether or not to establish a communication connection to the partner communication device based on a bearing of each of the portable wireless communication device and the partner communication device, the first attitude information, and the second attitude information. The program may be stored on a computer-readable information storage medium.

BRIEF DESCRIPTION OF DRAWINGS

FIG. 6 is a table for showing a configuration of a monitoring table.

DESCRIPTION OF EMBODIMENTS

An embodiment of the present invention is specifically described below in detail with reference to the drawings.

Figure 1:
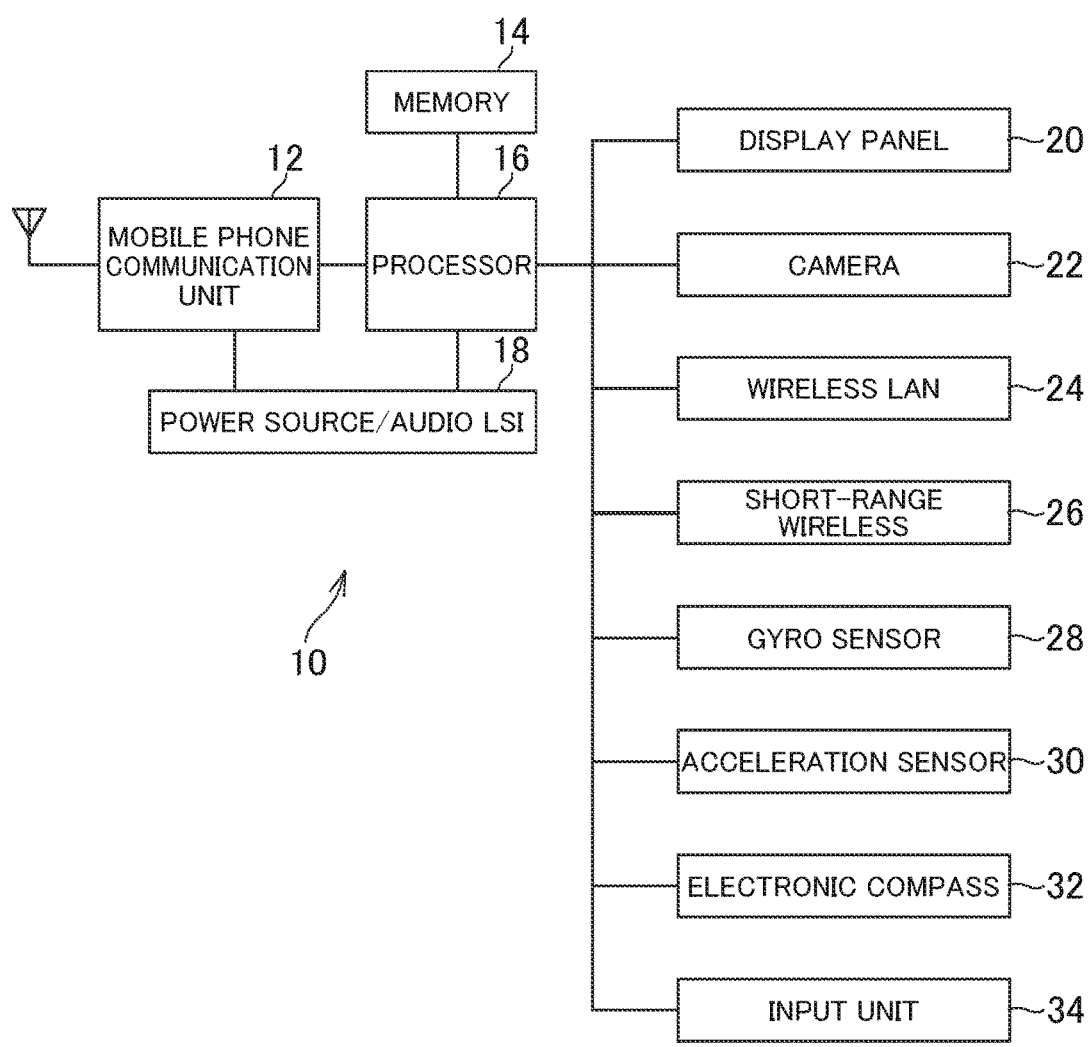
FIG. 1 is a diagram for illustrating a configuration of a portable wireless communication device according to an embodiment of the present invention.
Figure 2:
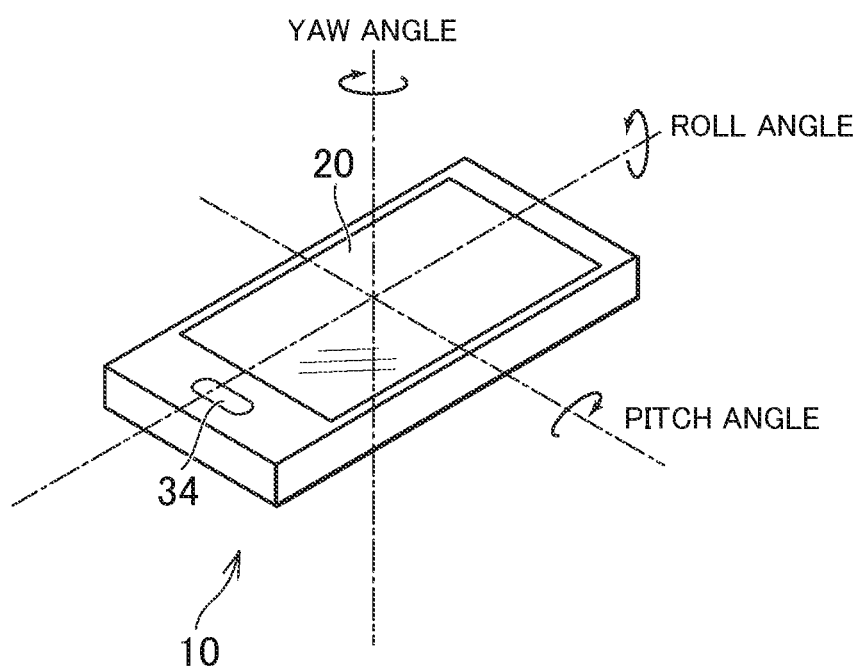
FIG. 2 is an external perspective view for illustrating the portable wireless communication device according to the embodiment of the present invention.

FIG. 1 is a diagram for illustrating a configuration of a portable wireless communication device according to the embodiment of the present invention. A portable wireless communication device 10 illustrated in FIG. 1 is configured as a smartphone, and includes a mobile phone communication unit 12, a memory 14, a processor 16, a power source/audio LSI 18, a display panel 20, a camera 22, a wireless LAN communication unit 24, a short-range wireless communication unit 26, a three-axis gyro sensor 28, a three-axis acceleration sensor 30, an electronic compass 32, and an input unit 34. As illustrated in FIG. 2, the portable wireless communication device 10 includes, for example, a thin rectangular-shaped housing, and includes, on a surface of the housing, a plate-like display panel 20 and a button which is a part of the input unit 34.

In FIG. 1, the mobile phone communication unit 12 includes a modem and a wireless communication unit, and is configured to carry out mobile phone wireless communication in accordance with various communication standards for mobile phones. The memory 14 includes a volatile memory and a non-volatile memory, and is accessed by the processor 16. The processor 16 includes a CPU and an internal memory, and is configured to control the portable wireless communication device 10 through execution of a program. The display panel 20 is formed of, for example, a liquid crystal display panel or an organic EL panel, and is configured to output display data supplied by the processor 16. The camera 22 is configured to pick up a still image and a movie. The wireless LAN communication unit 24 is configured to carry out wireless LAN communication in accordance with the IEEE 802.11 standard. The short-range wireless communication unit 26 is configured to carry out power-saving wireless communication to/from a device that is relatively close to the portable wireless communication device 10. The short-range wireless communication is carried out via, for example, Bluetooth.

As illustrated in FIG. 2, the three-axis gyro sensor 28 is configured to detect a roll angular velocity of the housing centered on a roll axis set in a longitudinal direction of the display panel 20, a pitch angular velocity of the housing centered on a pitch axis set in a lateral direction of the display panel 20, and a yaw angular velocity of the housing centered on a yaw axis set in a normal direction of the display panel 20. The processor 16 time-integrates those values, to thereby obtain attitude information, that is, a roll angle, a pitch angle, and a yaw angle.

The three-axis acceleration sensor 30 is configured to detect an acceleration of the housing in directions of three axis illustrated in FIG. 2. The processor 16 can determine which orientation in a horizontal direction the housing is held in, and how far the housing has moved in which orientation, based on the acceleration in those three directions. The electronic compass 32 is configured to output information on which bearing the roll axis set in the housing (see FIG. 2) is facing by detecting the orientation of earth magnetism. The electronic compass 32 can acquire the correct bearing when the pitch angle and the roll angle of the housing from horizontal plane are less than a fixed angle. In order to obtain a more accurate bearing, a bearing output by the electronic compass 32 may be corrected by a value output by the gyro sensor 28. The input unit 34 is formed of buttons provided on the surface of the housing, and a touch panel provided on the surface of the display panel 20.

In this embodiment, short-range wireless communication is carried out between two or more portable wireless communication devices 10 by the short-range wireless communication unit 26. In this case, it is normally necessary to manually conduct a communication connection procedure called "pairing" between the two portable wireless communication devices 10. However, in this embodiment, this procedure is carried out intuitively, as described below.

Figure 3:
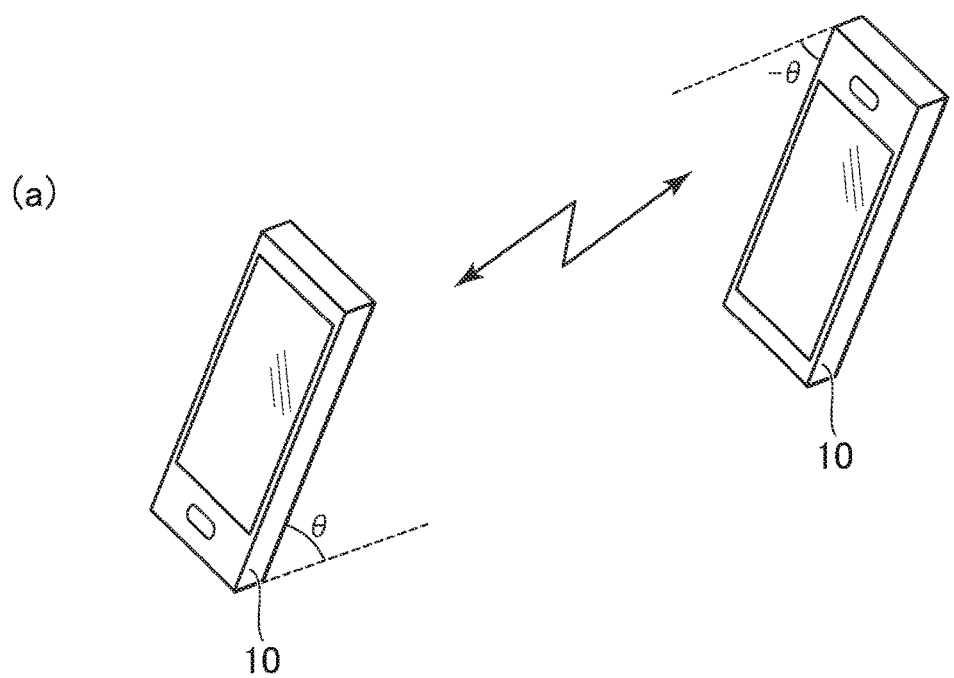
FIG. 3 are diagrams for illustrating a task of establishing a communication connection between two portable wireless communication devices.
Figure 3:
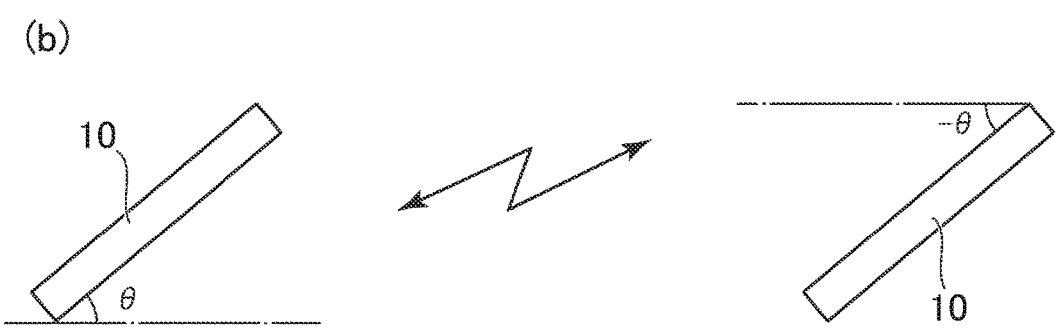

FIG. 3 are diagrams for illustrating a procedure for a wireless communication connection used for the portable wireless communication device 10 according to this embodiment. FIG. 3(a) is a perspective view for illustrating two portable wireless communication devices 10 currently undergoing the connection procedure, and FIG. 3(b) is aside view for illustrating the same. As illustrated in FIG. 3, each user of the two portable wireless communication devices 10 holds his or her portable wireless communication device 10 and brings the portable wireless communication device 10 closer to the other portable wireless communication device 10. At this time, each user changes, while watching their partner's portable wireless communication device 10, the position and attitude of his or her own portable wireless communication device 10 so that the two portable wireless communication devices 10 come closer to each other, their housings face each other, and pitch angles θ of the housings are reversed.

Each portable wireless communication device 10 acquires its own pitch angle θ from output of the gyro sensor 28, and acquires the bearing in which the portable wireless communication device 10 is facing from the electronic compass 32. Further, each portable wireless communication device 10 receives, from the partner device via the short-range wireless communication unit 26, the pitch angle θ obtained by the partner device from the output of the gyro sensor 28, and the bearing obtained from the electronic compass 32. Further, each portable wireless communication device 10 acquires, from the short-range wireless communication unit 26, a reception level (received signal strength indicator (RSSI)) of a wireless signal from the partner device.

Then, based on the pitch angles θ and the bearings of the two portable wireless communication devices 10, and the reception level of the wireless signal from the partner device, the portable wireless communication device 10 determines whether or not to establish a communication connection to the partner device. More specifically, when a value obtained by subtracting 180° from a difference in bearings is less than a predetermined value, the sum of the pitch angles is less than a predetermined value, and the reception level is equal to or more than a certain value (in this case, when the RSSI corresponds to "Immediate"), a terminal ID of the partner device is added to a monitoring table, and the pitch angles θ, the bearings, and the reception level are obtained for a certain period of time. In this case, the sum of the pitch angles θ indicates a deviation from a state in which the pitch angles θ of the two portable wireless communication devices 10 are reversed. The value obtained by subtracting 180° from the difference in bearings indicates a deviation from a state in which the two portable wireless communication devices 10 are facing each other. Further, the reception level indicates the proximity of the two portable wireless communication devices 10 to each other. Evaluation values corresponding to a decreasing function of the sum of the pitch angles, a decreasing function of the value obtained by subtracting 180° from the difference in bearings, and an increasing function of the reception level are calculated successively, to thereby select, based on those evaluation values, a portable wireless communication device 10 to which a communication connection is to be established from among devices included in the monitoring table. The evaluation values in this case are values that indicate a degree to which the communication connection is to be established to the partner device.

According to this embodiment, as described above, each user performs, while watching their partner's portable wireless communication device 10, an intuitive operation of changing the position and attitude of his or her own portable wireless communication device 10 so that the two portable wireless communication devices 10 come closer to each other, their housings face each other, and the pitch angles θ of the housings are reversed. As a result, the communication connection can be established between the two portable wireless communication devices 10. In particular, according to this embodiment, in order to establish the communication connection, the user needs to adjust his or her own portable wireless communication device 10 while watching the pitch angle θ of their partner's portable wireless communication device 10 so that the pitch angle θ of their own portable wireless communication device 10 are reversed. Through this operation, it is possible to more reliably connect to the intended partner's portable wireless communication device 10.

Figure 4:
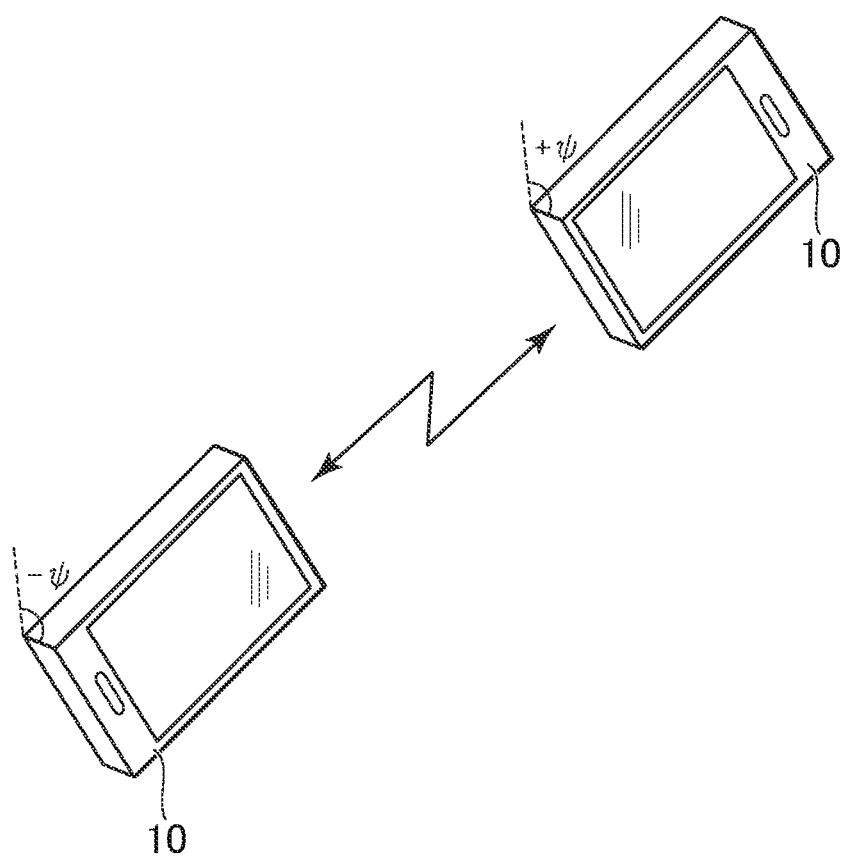
FIG. 4 is a diagram for illustrating a modification example of the task of establishing a communication connection between two portable wireless communication devices.

In the example of FIG. 3, the user is required to reverse the pitch angles θ of the two portable wireless communication devices 10 in order to establish the communication connection, but as illustrated in FIG. 4, the user may be required to reverse the roll angles of the two portable wireless communication 10. Even in this case, it is possible to more reliably connect to the intended partner's portable wireless communication device 10.

As described above, the short-range wireless communication unit 26 is configured to carryout data communication via Bluetooth in this embodiment. Two or more portable wireless communication devices 10 are directly or indirectly connected via Bluetooth and the whole of them form a network. The portable wireless communication device 10 has a data relay function, and forwards various pieces of data that have been transmitted from another portable wireless communication device 10 to still another portable wireless communication device 10. In this way, data can be transmitted to any portable wireless communication device 10 in the network. Further, data can be shared to all portable wireless communication devices 10 as necessary.

Figure 5:
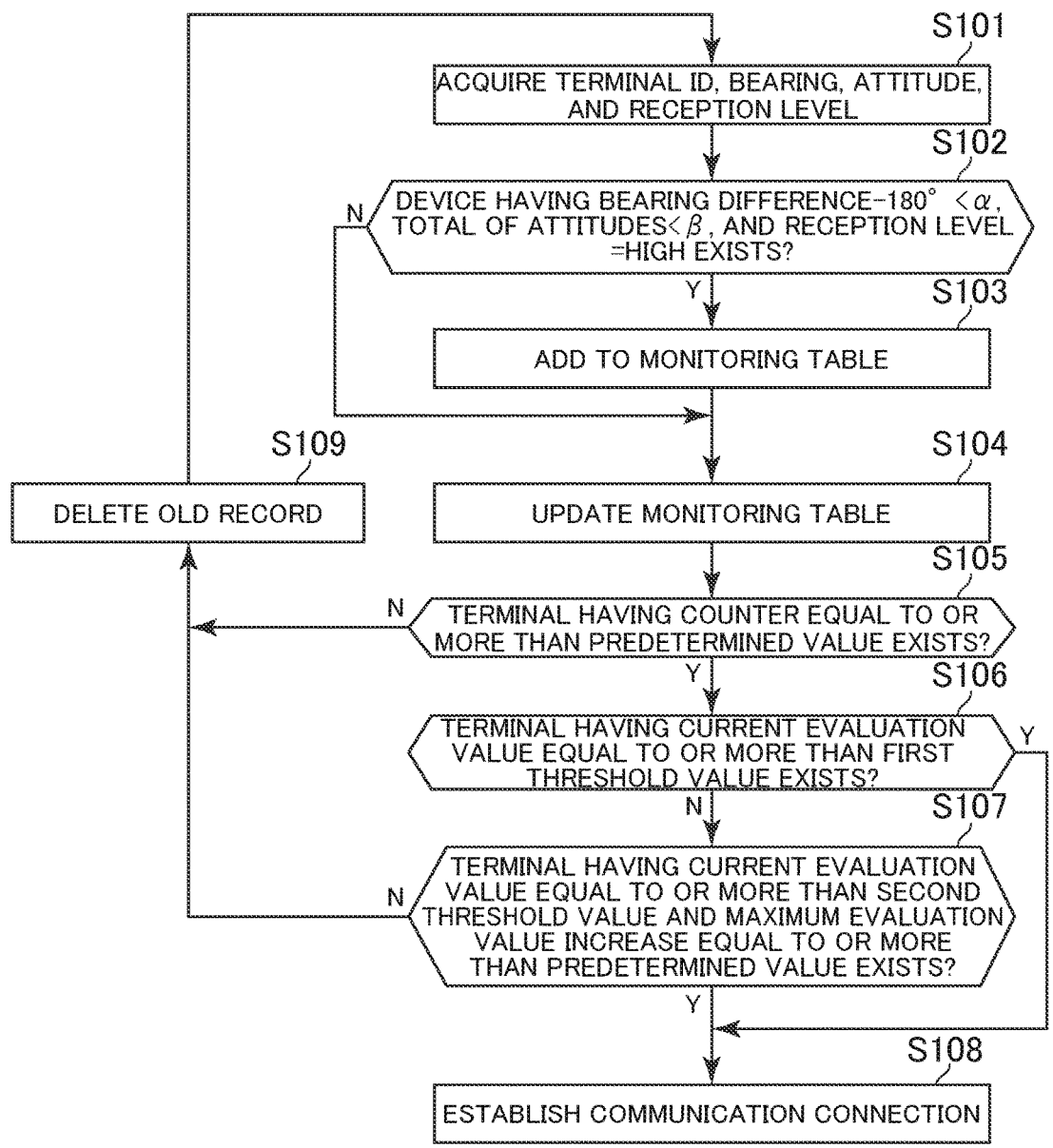
FIG. 5 is a flowchart for illustrating a communication connection in the portable wireless communication device according to the embodiment of the present invention.

FIG. 5 is a flowchart for illustrating communication connection in the portable wireless communication device 10. Processing illustrated in FIG. 5 (S101 to S109) is iterated every predetermined period when a communication function is started in the portable wireless communication device 10. This processing is implemented by the processor 16 executing a communication connection program. The communication connection program may be downloaded from a communication network, for example, a mobile phone network, or may be installed from various types of memory cards.

The portable wireless communication device 10 constantly broadcasts advertisement packets via Bluetooth Low Energy (LE). The advertisement packets include the terminal ID of the portable wireless communication device 10, the bearing output from the electronic compass 32, and a pitch angle θ (attitude information) obtained by time-integrating output from the gyro sensor 28.

When the portable wireless communication device 10 establishes a communication connection to another portable wireless communication device 10, the portable wireless communication device 10 first reads the terminal ID, the bearing, and the attitude from a reception buffer included in the short-range wireless communication unit 26. Those pieces of data are acquired from an advertisement packet transmitted from the another portable wireless communication device 10. The portable wireless communication device 10 further acquires the reception level of the received advertisement packet from the short-range wireless communication unit 26 (S101).

Next, the portable wireless communication device 10 acquires the bearing from the electronic compass 32, and determines whether or not a value obtained by subtracting 180° from a difference between the obtained bearing and a bearing received from the another portable wireless communication device 10 is less than a predetermined value α. The portable wireless communication device 10 then acquires the pitch angle θ of the portable wireless communication device 10 obtained based on the output from the gyro sensor 28, and determines whether or not a sum of that pitch angle θ and a pitch angle θ received from the another portable wireless communication device 10 is less than a predetermined value β. The portable wireless communication device 10 further determines whether or not the reception level obtained in Step S101 is equal to or more than a predetermined value (in this case, RSSI="Immediate"). Then, when all the determinations are positive and no records are yet created in the monitoring table shown in FIG. 6, the data acquired in Step S101 is stored in the monitoring table (S103).

FIG. 6 is a table for showing a configuration of the monitoring table. As shown in FIG. 6, the monitoring table includes records regarding all other portable wireless communication devices 10 that have satisfied the conditions of Step S102 once. Each of those records includes the terminal ID, a bearing D and a pitch angle P received from the portable wireless communication device 10 identified from the terminal ID, a reception level R of the portable wireless communication device 10, a current evaluation value, which is the newest evaluation value, maximum evaluation value increase, a counter, and a list registration time. The evaluation values are updated each time the bearing D and the pitch angle P are received from the portable wireless communication device 10, and are obtained by substituting those values into a function for the evaluation value. As described above, the function for the evaluation value is the decreasing function of the sum of the pitch angles, the decreasing function of the value obtained by subtracting 180° from the difference in bearings, and the increasing function of the reception level. One example of the function for the evaluation value may be a product of a reciprocal of the sum of the pitch angles, a reciprocal of the value obtained by subtracting 180° from the difference in bearings, and a step function that is 1 when the reception level is equal to or more than a predetermined value. The maximum evaluation value increase is a maximum width of temporal change of the evaluation value per constant time (in this case, an update cycle of the monitoring list) in the past. The counter is a number of times that the data acquired in Step S101 satisfies the conditions of Step S102. The counter to be stored in the monitoring table may be a weighted counter. For example, an integrated value of the current evaluation value can be the weighted counter. Further, the list registration time is a time at which a new record is added to the monitoring table in Step S103.

In Step S104, the monitoring table is updated based on the data acquired in Step S101. Specifically, the bearing D, the pitch angle P, and the reception level R associated with the terminal ID are added to the monitoring table, and the current evaluation value is updated based on the newest data. Further, a difference between an evaluation value calculated most recently and the current evaluation value is calculated, and the maximum evaluation value increase is updated. Further, it is determined whether or not the newest data satisfies the conditions of Step S102. When the newest data satisfies the conditions, the counter is incremented by 1.

The bearing and attitude used to calculate the evaluation value may be average values of the bearing and attitude obtained at the most recent plurality of timings, respectively. In this way, the user's active operation of changing the attitude of the user's own housing in every direction while watching the partner's housing to find out, by trial and error, the right combination to satisfy the communication connection conditions can be prevented from adversely affecting the evaluation values.

Thereafter, it is determined whether or not there is a portable wireless communication device 10 that has a counter equal to or more than a predetermined value (S105). When such a portable wireless communication device 10 exists, it is then determined whether or not a portable wireless communication device having a current evaluation value equal to or more than a first threshold value exists out of those portable wireless communication devices 10 (S106). The first threshold value is a value larger than a second threshold value to be described later. When the current evaluation value is equal to or more than the first threshold value, the communication connection is established to one of those portable wireless communication devices 10. For example, the communication connection is established to the portable wireless communication device 10 having the largest current evaluation value (S108). For example, the portable wireless communication devices exchange link keys, which are pieces of authorization information, to thereby enter a state in which encrypted communication between the devices is possible.

When there is no portable wireless communication device 10 that satisfies the condition of Step S106, it is determined whether or not, among the portable wireless communication devices 10 that satisfy the condition of Step S105, there is a portable wireless communication terminal 10 having a current evaluation value equal to or higher than the above-mentioned second threshold value, and a maximum evaluation value increase equal to or higher than a predetermined value (S107). When such a portable wireless communication device 10 exists, a communication connection is then established to one such portable wireless communication device 10. For example, a communication connection may be established to the portable wireless communication device 10 having the largest current evaluation value. Alternatively, a communication connection may be established to the portable wireless communication device 10 having the largest maximum evaluation value increase width. Still alternatively, a weighted sum of the current evaluation value and the maximum evaluation increase width may be calculated to calculate a total evaluation value, to thereby establish a communication connection to the portable wireless communication device 10 having the largest total evaluation value.

When the determination in Step S105 or Step S107 is negative, the processing proceeds to Step S109, and an old record is deleted from the monitoring table. Specifically, the portable wireless communication device 10 acquires the current time and, when there is a record having a time that is a predetermined time after the list registration time, deletes that record. Thereafter, the processing of Step S101 and subsequent steps is carried out again.

In the above-mentioned processing, the communication connection is only established to the portable wireless communication device 10 having a counter equal to or more than a predetermined value. Because of this, as the period of time in which the conditions of Step S102, which relate to the determination of establishing a communication connection, is satisfied becomes longer, the communication connection to the partner communication device becomes more preferential. In this way, it is possible to avoid erroneously establishing a communication connection to a portable wireless communication device 10 that accidentally and instantaneously satisfies the conditions.

In the above-mentioned processing, even when the current evaluation value is less than the first threshold value, the portable wireless communication device 10 is connected to communicate to/from a portable wireless communication device 10 having a current evaluation value equal to or more than the second threshold value and a maximum evaluation value increase equal to or more than a predetermined value. Therefore, a communication connection can be established when the user actively moves the housing so that both the housings face each other, the attitudes of the housings are reversed, and the housings come closer to each other. This embodiment takes the maximum evaluation value increase into consideration, and hence, even when there happens to be another portable wireless communication device 10 having an evaluation value equal to or higher than the second threshold value in the vicinity of the portable wireless communication device which has started the communication connection, no communication connection is erroneously established to such other portable wireless communication device.

The above-mentioned embodiment is merely an example. The scope of the present invention is not limited to the embodiment, and various modification examples of the present invention are possible.

For example, in the determination in Step S107 of FIG. 5, it may be further determined, based on the data in the monitoring table, whether or not the attitude of another portable wireless communication device 10 has changed over a predetermined period of time. When a portable wireless communication device 10 that has not moved for the predetermined period of time exists, it is desired that a communication connection not be established to such a portable wireless communication device 10. In Step S101, when a value of the acceleration sensor 30 is also received from the another portable wireless communication device 10, it can also be determined from that value whether or not the portable wireless communication device 10 has moved over a predetermined period of time. In this way, it is possible to avoid establishing a communication connection without an active operation for a communication connection by a user.

Further, when the reception level of a wireless signal transmitted from an already-connected portable wireless communication device 10 has fallen below a predetermined value after a wireless communication connection has been established in Step S108, the communication connection may be terminated.

The invention claimed is:

1. A portable wireless communication device, comprising:
at least one processor; and
at least one memory device that stores a plurality of instructions, which when executed by the at least one processor, causes the at least one processor to operate to:
acquire first attitude information indicating a roll angle or a pitch angle of the portable wireless communication device;
receive, via wireless communication, second attitude information indicating a roll angle or a pitch angle of a partner communication device from the partner communication device; and
determine whether or not to establish a communication connection to the partner communication device based on a combination of (i) a difference between a bearing of the portable wireless communication device and a bearing of the partner communication device, and (ii) a sum of the pitch angle of the portable wireless communication device and the pitch angle of the partner communication device, or a sum of the roll angle of the portable wireless communication device and the roll angle of the partner communication device;
wherein, in the determination, the at least one processor calculates an evaluation value indicating a degree to which a communication connection is to be established to the partner communication device, and determines whether or not to establish a communication connection to the partner communication device based on a temporal change of the evaluation value, the evaluation value being calculated based on a combination of (i) the bearing of each of the portable wireless communication device and the partner communication device, (ii) the first attitude information, and (iii) the second attitude information.

2. The portable wireless communication device according to claim 1,
wherein the first attitude information and the second attitude information each indicate the pitch angle with respect to a pitch axis that is parallel in a lateral direction of a display panel.

3. The portable wireless communication device according to claim 2,
wherein, in the determination, the at least one processor determines whether or not to establish the communication connection to the partner communication device further based on a reception level of a wireless signal transmitted from the partner communication device.

4. The portable wireless communication device according to claim 1,
wherein, in the determination, the at least one processor more preferentially establishes the communication connection to the partner communication device as a period of time, in which a condition that relates to the communication connection is satisfied, becomes longer.

5. The portable wireless communication device according to claim 1,
wherein the first attitude information and the second attitude information each indicate the roll angle with respect to a roll axis that is parallel in a longitudinal direction of a display panel.

6. The portable wireless communication device according to claim 1,
wherein, in the determination, the at least one processor determines whether or not to establish the communication connection to the partner communication device further based on a reception level of a wireless signal transmitted from the partner communication device.

7. The portable wireless communication device according to claim 1,
wherein, in the determination, the at least one processor more preferentially establishes the communication connection to the partner communication device as a period of time, in which a condition that relates to the communication connection is satisfied, becomes longer.

8. The portable wireless communication device according to claim 1,
wherein, in the determination, the at least one processor limits establishment of the communication connection to the partner communication device when a position or an attitude of the partner communication device is not changing.

9. The portable wireless communication device according to claim 1, the at least one processor terminates the communication connection to the partner communication device based on a reception level of a wireless signal transmitted from the partner communication device.

10. A wireless communication method, comprising:
acquiring first attitude information indicating a roll angle or a pitch angle of a portable wireless communication device;
receiving, via wireless communication, second attitude information indicating a roll angle or a pitch angle of a partner communication device from the partner communication device; and
determining whether or not to establish a communication connection to the partner communication device based on a combination of (i) a difference between a bearing of the portable wireless communication device and a bearing of the partner communication device, and (ii) a sum of the pitch angle of the portable wireless communication device and the pitch angle of the partner communication device, or a sum of the roll angle of the portable wireless communication device and the roll angle of the partner communication device;
wherein, in the determination, an evaluation value indicating a degree to which a communication connection is to be established to the partner communication device is calculated, and it is determined whether or not to establish a communication connection to the partner communication device based on a temporal change of the evaluation value, the evaluation value being calculated based on a combination of (i) the bearing of each of the portable wireless communication device and the partner communication device, (ii) the first attitude information, and (iii) the second attitude information.

11. A non-transitory computer readable storage medium storing a plurality of instructions, wherein when executed by at least one processor, the plurality of instructions cause the at least one processor to:
acquire first attitude information indicating a roll angle or a pitch angle of a portable wireless communication device;

receive, via wireless communication, second attitude information indicating a roll angle or a pitch angle of a partner communication device from the partner communication device; and determine whether or not to establish a communication connection to the partner communication device based on a combination of (i) a difference between a bearing of the portable wireless communication device and a bearing of the partner communication device, and (ii) a sum of the pitch angle of the portable wireless communication device and the pitch angle of the partner communication device, or a sum of the roll angle of the portable wireless communication device and the roll angle of the partner communication device;

wherein, in the determination, the at least one processor calculates an evaluation value indicating a degree to which a communication connection is to be established to the partner communication device, and determines whether or not to establish a communication connection to the partner communication device based on a temporal change of the evaluation value, the evaluation value being calculated based on a combination of (i) the bearing of each of the portable wireless communication device and the partner communication device, (ii) the first attitude information, and (iii) the second attitude information.

* * * * *